ELECTRONIC RELAY RESPONSIVE TO INSTANTANEOUS POLARITY OF CONTROL SIGNAL WHETHER ALTERNATING CURRENT OR DIRECT CURRENT

Filed Feb. 8, 1961

INVENTORS.
CARMINE N. PAGANO
ERNEST H. P. BIGO
RAYMOND C. P. HINTON
BY Philip M. Bolton
ATTORNEY 3,054,003

ELECTRONIC RELAY RESPONSIVE TO INSTANTANEOUS POLARITY OF CONTROL SIGNAL WHETHER ALTERNATING CURRENT OR DIRECT CURRENT

Carmine N. Pagano, New York, N.Y., and Ernest H. P. Bigo, Nutley, and Raymond C. P. Hinton, West Englewood, N.J., assignors to International Telephone and Telegraph Corporation, Nutley, N.J., a corporation of Maryland Filed Feb. 8, 1961, Ser. No. 87,864
11 Claims. (Cl. 307—88.5)

The present invention relates to switching circuits and more particularly to an electronic circuit equivalent of an electro-mechanical relay.

In the past, the use of electro-mechanical relays in signally applications had been adequate due to the relatively slow-rate operation of the signalling equipments. However, with the advent of high-speed signalling equipment employing semiconductor devices, the relatively large mass mechanical relays with their inherent contact bounce and chatter became undesirable. Vacuum tube relays have in some instances been employed in high speed signalling applications, but their large size, high power requirements, and complex circuitry also render them inadequate. Semiconductor devices have also been heretofore employed in applications where relay operation is desired. The most serious disadvantages with presently available semiconductor equivalents of relay circuits is their inability to withstand high voltages, and that their performance is generally not the exact equivalent of that of the relay circuit.

It is an object of the present invention to provide an improved high speed electronic equivalent of a mechanical relay, particularly one which has the advantage of being electrically isolated from its driving source and is capable of detecting both steady state and transient line conditions.

The present invention provides an electronic relay circuit having a channel for D.C. and low frequency A.C. signals and a channel for higher frequency A.C. signals, both coupled to but electrically isolated from an input line by a magnetic amplifier and a transformer respectively. Both the D.C. and low frequency A.C. channel (hereinafter called the magnetic amplifier channel) and the higher frequency channel (hereinafter called the transformer channel), are connected to a bistable device. Signals from the magnetic amplifier channel or the transformer channel are applied to the bistable device depending on the frequency of the input present on the input line, and the bistable device is conditioned in one of two states depending on the polarity of the input signal. A control circuit is provided to prevent signals on the magnetic amplifier channel from operating the bistable device when signals are also present on the transformer channel.

The present invention is explained with reference to the drawings in which.

Figure 1:
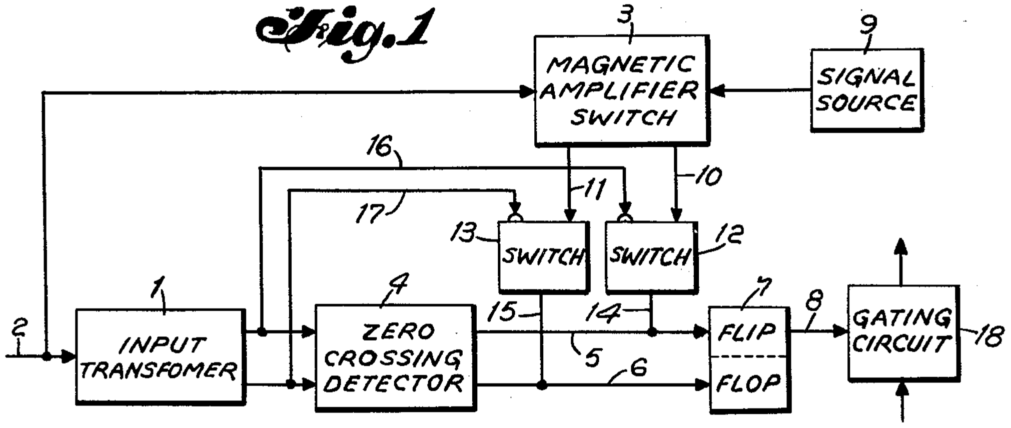
FIG. 1 is a block diagram of a preferred embodiment of a switching circuit following the principles of the present invention.

Referring to FIG. 1, a switching circuit responsive to changes in input signal polarity is shown including an input transformer 1 connected to an input line 2 on which input signals of changing polarities at frequencies ranging from D.C. to high frequency A.C. may be present. Input transformer 1, being an A.C. device, has a frequency response such that input signals above a first given frequency (e.g. 8 c.p.s.) up to a frequency approximately 25,000 c.p.s. appear on its secondary coil. It is to be noted that the upper frequency is limited by the quality of the transformer employed. A magnetic amplifier 3 is also coupled to input line 2 and has a frequency response ranging from D.C. up to a second given frequency (e.g. 20 c.p.s.). Transformer 1 and magnetic amplifier 3 serve to electrically isolate input line 2 from the rest of the circuitry. Transformer 1 is coupled to a zero crossing detector 4 which produces a positive output signal on either conductor 5 or conductor 6 depending on whether the input signal is going from negative to positive or from positive to negative. Conductors 5 and 6 are coupled to flip-flop 7 which is conditioned in one of two states depending on whether a signal is present on conductor 5 or conductor 6. An output signal is produced, as a result of the state of flip-flop 7, on output line 8 and output line 8 will be either at zero or negative potential depending on the state of flip-flop 7.

Magnetic amplifier 3, which is responsive to D.C. and low frequency A.C. signals as stated, is also coupled to input line 2. Signal source 9 providing, for example, a 60 c.p.s. signal, is coupled to magnetic amplifier 3 such that input signals on line 2 which are going from negative to positive will cause magnetic amplifier 3 to switch a positive signal derived from source 9 onto conductor 10 while an input signal going from positive to negative will produce a positive signal on conductor 11. Conductors 10 and 11 are coupled through normally closed switches 12 and 13 to conductors 14 and 15 so that the positive signals on conductors 14 and 15 will condition flip-flop 7 in a manner described above, thereby producing an output signal on conductor 8 also as described.

The output potential on conductor 8 will be switched between two distinct potentials due to the operation of flip-flop 7. The potential change can be used to control circuit conditions, for example, to control the conduction of a signal through gating circuit 18, and thereby function as a switching circuit.

It is noted that input signals below a first given frequency will not appear on the secondary coil of transformer 1, but will instead operate magnetic amplifier 3 to cause signal switching on conductor 8. Therefore magnetic amplifier 3 causes the circuit to be responsive to D.C. and low frequency A.C. input signals, and transformer 1 causes the circuit to be responsive to high frequency A.C. signals. It is also noted that magnetic amplifier 3 is also responsive to A.C. input signals having frequencies above said first given frequency (i.e. from 8 c.p.s. to 20 c.p.s.) and tends to be operative at the same time as transformer 1. Since magnetic amplifier 3 has a slower response than transformer 1, it is necessary to eliminate the signal in the magnetic amplifier channel at the moment the input signal is conducted by the transformer channel in order to prevent interference. To achieve this end, the signals from the secondary coil of transformer 1 are coupled to switches 12 and 13 by conductors 16 and 17. Signals from the secondary coil of transformer 1 open switches 12 and 13 and thereby prevent signals in the magnetic amplifier channel from reaching flip-flop 7.

It is seen that the circuit shown in FIG. 1 operates in the same manner as an electro-mechanical relay. A change in polarity of an input signal causes an output line to switch potential; the circuit is electrically isolated from the input line; the circuit is responsive to input signals frequencies from D.C. to high frequency A.C.; and it is capable of high speed operation.

Figure 2:
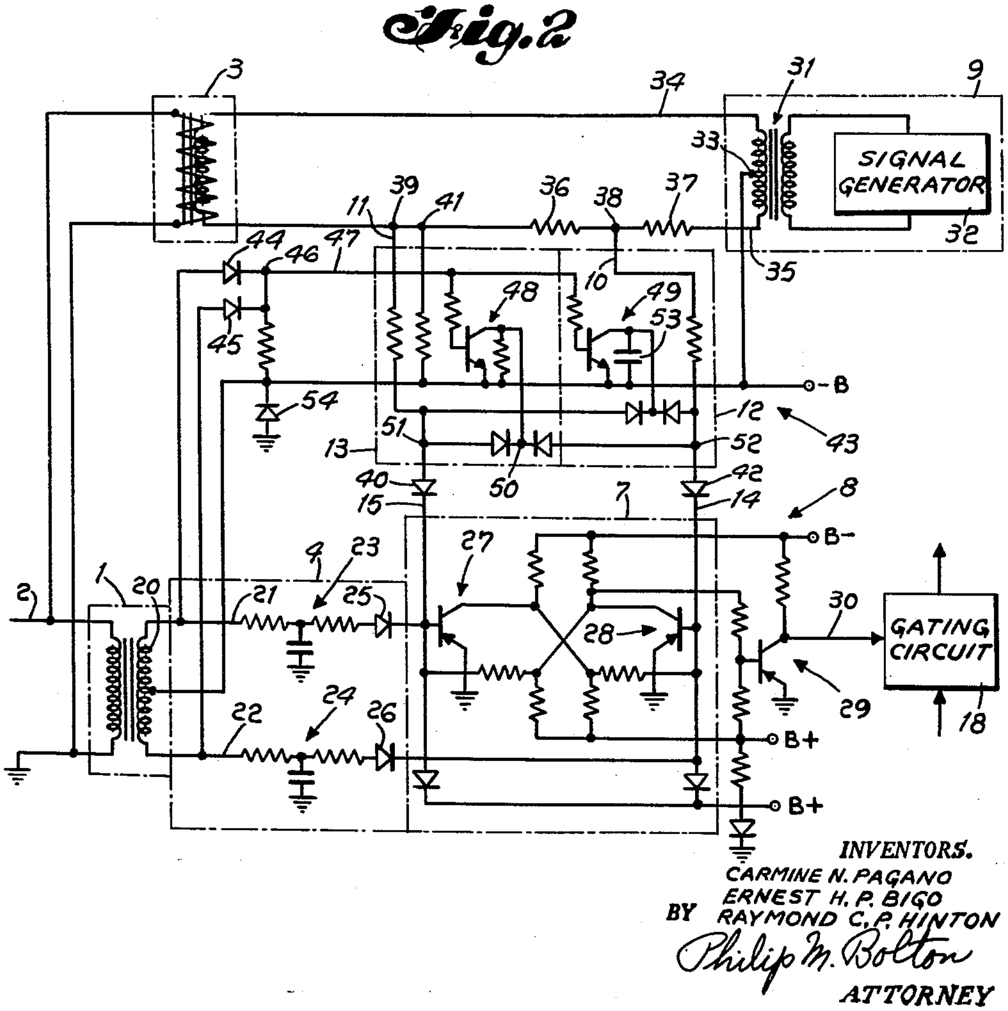
FIG. 2 is a schematic diagram of the preferred embodiment of the switching circuit shown in FIG. 1.

A more complete understanding of the present invention may obtained by reference to the circuit shown in FIG. 2 wherein elements previously designated in FIG. 1 are given the same reference numerals. Referring to FIG. 2, an input transformer 1 is coupled through its primary coil to input line 2. Input signals having a frequency above a first given value, for example 8 c.p.s., will appear across secondary winding 20. Secondary winding 20, is center-tapped through to a slightly negative reference potential (diode 54 being a voltage clamp) so the input signal appears as two balanced signals of opposing phase on conductors 21 and 22. Identical R-C low pass filter circuits 23 and 24 are coupled to conductors 21 and 22 to remove undesired transient noise. The balanced, opposing phase signals from filters 23 and 24 are passed through diodes 25 and 26 which pass only the positive portions of the signals. Since the signal on conductor 22 is of opposite phase with respect to the input signal, the negative portions of the input signal will pass through diode 26 as positive pulses. In the presence of an A.C. input signal above the first given frequency (8 c.p.s.) there will alternately be a signal passing through diode 25 or 26 as the input signal changes polarity. The arrangement of diodes 25 and 26 with respect to secondary coil 20 functions as a zero crossing detector in that it detects the zero crossings of the input signal as it alternates.

The output of diode 25 is coupled to the base of one semiconductor 27 of bistable flip-flop 7 and the output of diode 26 is coupled to the base of the other semiconductor 28. When semiconductor 27 is conducting semiconductor 28 is cut-off, and vice-versa. The occurrence of positive signal at their bases from diode 25 or 26 will cut off semiconductor 27 or 28 respectively. A semiconductor amplifier 29 is coupled to the output of flip-flop 7, or more specifically to the collector of semiconductor 28. When semiconductor 28 is cut off, semiconductor 29 is saturated and output line 30 is at zero potential. When semiconductor 28 is conducting, semiconductor 29 is cut off and output line 30 is at negative potential. The combination of flip-flop 7 and semiconductor 29 also provides that the output potential on line 30 is a step response independent of the input signal rise time.

Input signals below the first given frequency (e.g. 8 c.p.s.), because of the frequency response of transformer 1, will not appear on secondary winding 20. These low frequency input signals, including D.C., are coupled to the control winding of magnetic amplifier 3. The signal winding of magnetic amplifier 3 is coupled through transformer 31 to a source of alternating signal 32 of a selected frequency, for example 60 c.p.s. The secondary winding 33 of transformer 31 is center-tapped to a slightly negative reference potential so that the signals on conductors 34 and 35 are balanced and out of phase with each other.

Magnetic amplifier 3 is biased such that when input signals below the first given frequency are going from negative to positive the magnetic amplifier core saturates and presents zero impedance. The magnetic amplifier then acts as a short circuit and the signals from conductors 34 and 35 appear respectively across equal resistors 36 and 37. Since the two signals are equal but opposite the potential at point 38 becomes zero with respect to point 39, and the alternating signal from secondary winding 33 is applied to diode 40 by means of conductor 11. Diode 40 passes the positive portions of the signal only, thereby operating semiconductor 27 of flip-flop 7 in a manner as previously described. If the input signal to the magnetic amplifier control winding were going from positive to negative the core would de-saturate and present an open circuit. The signal on conductor 35 would pass on conductor 10 through diode 42 to the base of semiconductor 28.

It is seen that input signals going from negative to positive will operate flip-flop 7 through semiconductor 27 and input signals going from positive to negative will operate the flip-flop through semiconductor 28. If the signals are above a first given frequency the operation occurs through transformer 1 and if the input signals are below the first given frequency the operation occurs through magnetic amplifier 3.

Input signals below the first given frequency will not appear on the secondary coil 20 of transformer 1 and consequently will not operate flip-flop 7, the flip-flop being operated through the magnetic amplifier path. However, input signals above the first given frequency (i.e. 8 c.p.s. to 20 c.p.s.) will tend to operate magnetic amplifier 3 while also appearing on secondary coil 20. It is therefore possible that the slower acting magnetic amplifier will interfere with the operation of flip-flop 7 when it is being driven through the path of transformer 1. To prevent this interference, the output signals from secondary coil of transformer 1 are coupled to a control circuit 43. The balanced, phase-opposed signals from secondary coil 20 are applied to diodes 44 and 45 and combined at point 46 so that the signal on conductor 47 will be in the form of positive ripple. This positive ripple signal is applied to the bases of semiconductors 48 and 49 thereby putting them into conduction. Semiconductor 48 will operate instantaneously, thereby putting point 50 and consequently points 51 and 52 at a negative potential sufficiently high to bias diodes 40 and 42 at non-conduction. The signal on conductor 10 or 11 is thereby inhibited from reaching flip-flop 7. Since the signal on conductor 47 is positive ripple, a second semiconductor 49 is provided having a time constant capacitor 53. The time delay associated with semiconductor 49 insures that during the variations in the ripple signal or conductor 47 the diodes 40 and 42 will still remain non-conductive. When the input signal frequency becomes lower than the first given frequency, no signal is present on secondary coil 20, semiconductors 48 and 49 cease conducting, the negative potentials at points 51 and 52 are removed, and flip-flop 7 is operated through the magnetic amplifier path. The output signal on conductor 30 may be coupled to a gating circuit 18 as described hereinabove, to function as a switching circuit therewith.

The above description has set forth a novel electronic switching circuit which is the equivalent of an electro-mechanical relay. The invention is compatible and may be used with mechanical switching equipment which now employ cumbersome mechanical relays, and is yet capable of high speed operation and may be likewise used with advanced semiconductor switching systems. The present circuit is capable of detecting both steady state and transient line conditions, is electrically isolated from its input source, has a low output impedance, provides a step output function independent of the input signal rise time, and its operating point is a function of its previous state. That is, the symmetry of the input signal is preserved since the drop-in and drop-out points of the circuit occur in a manner similar to electro-mechanical relays.

While we have described above the principles of our invention in connection with specific apparatus, it is to be clearly understood that this description is made only by way of example and not as a limitation to the scope of our invention as set forth in the objects thereof and in the accompanying claims.

We claim:

1. A switching circuit responsive to input signal polarities comprising first means responsive to input signals above a first given frequency to provide output signals characteristic of the polarities of said input signals above said first given frequency, second means responsive to input signals below a second given frequency to provide output signals characteristic of the polarities of said input signals below said second given frequency, means responsive to the output signals of said first and second responsive means to produce an output signal corresponding to the polarities of said input signals, and control means responsive to the output signals of said first responsive means to inhibit the output signals of said second responsive means for input signals greater than said first given frequency.

2. A switching circuit according to claim 1 wherein said second given frequency is greater than said first given frequency.

3. A switching circuit responsive to input signal polarities comprising first means responsive to input signals above a first given frequency to provide an output signal characteristic of the polarities of said input signals above said first given frequency, a separate source of signals, second means responsive to input signals below a second given frequency and to signals from said separate source to provide an output signal characteristic of the polarities of said input signals below said given frequency, said second given frequency being greater than said first given frequency, means responsive to the output signals of said first and second responsive means to produce an output signal corresponding to the polarities of said input signals, and control means responsive to the output signal of said first responsive means to inhibit the output signal of said second responsive means for input signals above said first given frequency.

4. A switching circuit responsive to input signal polarities comprising first means responsive to input signals above a first given frequency to provide output signals characteristic of the polarities of said input signals above said first given frequency, a first pair of paths coupled to said first responsive means, a first one of said paths conveying output signals of said first responsive means characteristic of a first input signal polarity and the other one of said paths conveying output signals of said first responsive means characteristic of a second input signal polarity, a separate source of signals, a second pair of paths coupled to said separate source of signals, second means responsive to input signals below a second given frequency coupled to said separate source of signals and said second pair of paths to switch the signals from said separate source onto a first one of said second pair of paths upon the occurrence of input signals below said second given frequency having one polarity and onto the other one of said second pair of paths upon the occurrence of input signals below said second given frequency having the opposite polarity, bistable means coupled to said first and second pairs of paths to provide a first output signal in response to signals on said first ones of said first and second pairs of paths and a second output signal in response to signals on said other ones of said first and second pairs of paths, and control means coupled to said first and second pairs of paths to inhibit the signals on said second pair of paths upon the occurrence of signals on said first pair of paths.

5. A switching circuit responsive to input signal polarities comprising first means responsive to changes in input signal polarity for input signals above a first given frequency to produce a first signal for negative to positive polarity changes of input signals above said first given frequency and a second signal for positive to negative polarity changes of input signals above said first given frequency, a separate source of signals, second means responsive to changes in input signal polarity for input signals below a second given frequency to produce a third signal for negative to positive polarity changes of input signals below said second given frequency and a fourth signal for positive to negative polarity changes of input signals below said second given frequency, said second given frequency being greater than said first given frequency, bistable means responsive to said first and third signals to produce a first output signal and responsive to said second and fourth signals to produce a second output signal, said first and second output signals of said bistable device being characteristic of the polarity of said input signals, and signal inhibiting means coupled to said first and second responsive means to inhibit said third and fourth signals from said second responsive means upon the occurrence of said first and second signals from said first responsive means.

6. A switching circuit responsive to input signal polarities comprising first means responsive to changes in input signal polarity for input signals above a first given frequency to produce a first signal for negative to positive polarity changes of input signals above said first given frequency and a second signal for positive to negative polarity changes of input signals above said first given frequency, a bistable flip-flop including first and second semiconductor devices, a first conductor, including a first unidirectional device, coupled to said first responsive means and said first semiconductor device for conducting said first signal from said first responsive means to said first semiconductor device to condition said bistable flip-flop in a first state, a second conductor, including a second unidirectional device, coupled to said first responsive means and said second semiconductor device for conducting said second signal from said first responsive means to said second semiconductor device to condition said bistable flip-flop in a second state, a separate source of signals a third conductor including a third unidirectional device coupled to said separate source of signals and said first semiconductor device, a fourth conductor including a fourth unidirectional device coupled to said separate source of signals and said second semiconductor device, second means responsive to changes in input signal polarity for input signals below a second given frequency coupled to said separate source of signals to switch said signals from said separate source of signals onto said third conductor upon the occurrence of negative to positive polarity changes of input signals below said second given frequency and to switch said signals from said separate source of signals onto said fourth conductor upon the occurrence of positive to negative polarity changes of input signals below said second given frequency, said second given frequency being greater than said first given frequency, said signals on said third and fourth conductors conditioning said bistable flip-flop in said first and second states respectively, and control means coupled to said first and second conductors and said third and fourth conductors to inhibit the signals on said third and fourth conductors upon the occurrence of signals on said first and second conductors.

7. A switching circuit according to claim 6 wherein said first responsive means includes a transformer having a secondary coil coupled to said first and second conductors.

8. A switching circuit according to claim 6 wherein said second responsive means includes a magnetic amplifier having a signal winding coupled to said separate source of signals.

9. A switching circuit responsive to input signal polarities comprising a transformer responsive to alternating current input signals above a first given frequency, detector means coupled to the output of said transformer to produce output signals corresponding to negative to positive and positive to negative polarity changes of said alternating current input signals above said given frequency, a separate source of signals, a magnetic amplifier coupled to said separate source of signals and responsive to direct current and alternating current input signals below a second given frequency to switch signals from said separate source in accordance with negative to positive and positive to negative polarity changes of said direct current and alternating current input signals below said second given frequency, said second given frequency being greater than said first given frequency, a bistable flip-flop coupled to said detector means and said separate source of signals, said bistable means being conditioned in a first state in response to signals from said detector means and from said separate source which correspond to negative to positive polarity changes of said input signals and in a second state in response to signals from said detector means and from said separate source which correspond to positive to negative polarity changes of said input signals, and control means coupled to said transformer and said separate source of signals to inhibit the signals from said separate source upon the occurrence of output signals from said transformer.

10. A switching circuit responsive to input signal polarities comprising first means responsive to input signals above a first given frequency to provide output signals characteristic of the polarities of said input signals above said first given frequency, second means responsive to input signals below a second given frequency to provide output signals characteristic of the polarities of said input signals below said second given frequency, bistable means responsive to the output signals of said first and second responsive means to produce an output signal corresponding to the polarities of said input signals, control means responsive to the output signals of said first responsive means to inhibit the output signals of said second responsive means for input signals greater than said first given frequency, and means coupled to said bistable means capable of being switched in response to the output signal therefrom.

11. A circuit for generating switching pulses in response to the polarities of input signals covering a frequency range comprising a relatively high frequency channel including means responsive to input signals above a first given frequency to provide output signals characteristic of the polarities of said input signals above said first given frequency, a relatively low frequency channel including means responsive to input signals below a second given frequency to provide output signals characteristic of the polarities of said input signals below said second given frequency, said second given frequency being greater than said first given frequency, means responsive to the said output signals of said high frequency and low frequency channels to produce an output signal corresponding to the polarities of said input signals, and control means responsive to the output signals of said high frequency channel to inhibit the output signals of said low frequency channel for input signals greater than said first given frequency.

No references cited.